US008506735B2

(12) United States Patent
Whitaker et al.

(10) Patent No.: US 8,506,735 B2
(45) Date of Patent: Aug. 13, 2013

(54) PRE-APPLIED PROTECTIVE JACKETING CONSTRUCTION FOR PIPE AND BLOCK INSULATION

(75) Inventors: Thomas Whitaker, Grand Junction, CO (US); Kevin J. MacKinnon, Mendham, NJ (US)

(73) Assignee: Industrial Insulation Group, LLC, Brunswick, GA (US)

( * ) Notice: Subject to any disclaimer, the term of this patent is extended or adjusted under 35 U.S.C. 154(b) by 0 days.

(21) Appl. No.: 12/494,943

(22) Filed: Jun. 30, 2009

(65) Prior Publication Data
US 2009/0260751 A1   Oct. 22, 2009

Related U.S. Application Data

(62) Division of application No. 11/938,675, filed on Nov. 12, 2007.

(60) Provisional application No. 60/887,892, filed on Feb. 2, 2007.

(51) Int. Cl.
| | |
|---|---|
| *E04B 2/00* | (2006.01) |
| *E04F 13/00* | (2006.01) |
| *B29C 65/00* | (2006.01) |
| *B32B 37/00* | (2006.01) |
| *C09J 5/04* | (2006.01) |

(52) U.S. Cl.
USPC .............................. 156/71; 156/294; 156/314

(58) Field of Classification Search
USPC ................... 156/71, 182, 196, 212, 214, 242, 156/244.11, 278, 293, 294, 314, 315
See application file for complete search history.

(56) References Cited

U.S. PATENT DOCUMENTS

| | | | |
|---|---|---|---|
| 3,628,572 A | 12/1971 | Shannon | |
| 3,818,949 A * | 6/1974 | Johnson | 138/158 |
| 4,022,248 A * | 5/1977 | Hepner et al. | 138/141 |
| 4,213,487 A * | 7/1980 | Funk et al. | 138/149 |
| 4,243,453 A | 1/1981 | McClintock | |
| 5,069,969 A | 12/1991 | McClintock et al. | |
| 5,427,849 A | 6/1995 | McClintock et al. | |

(Continued)

FOREIGN PATENT DOCUMENTS

| | | |
|---|---|---|
| JP | 62-096576 | 5/1987 |
| JP | 05017722 | 1/1993 |

(Continued)

OTHER PUBLICATIONS

Typical Property Data for PQ.tm Liquid Sodium Silicates copyright 2007.

*Primary Examiner* — Philip Tucker
*Assistant Examiner* — Brian R Slawski
(74) *Attorney, Agent, or Firm* — Leason Ellis LLP (57) ABSTRACT

A protective jacketing-insulation composite structure and method is provided for inhibiting the corrosion of a pipeline. The method includes forming a porous-insulation into an elongated-arcuate-shape, applying a sodium silicate solution layer to the insulation and at least partially within the pores thereof, permitting the sodium silicate solution layer to set to a threshold amount, adhering an outer facing to the sodium silicate solution layer after the permitting step is accomplished, installing the insulation and facing to the outer surface of a pipeline, and sealing any exposed edges or seams that may exist between multiple installed products. A structure such as made from this method can have a release layer and contact adhesive.

7 Claims, 5 Drawing Sheets

(56) References Cited

U.S. PATENT DOCUMENTS

| | | | |
|---|---|---|---|
| 5,830,548 A | 11/1998 | Andersen et al. | |
| 5,934,337 A | 8/1999 | Fiala et al. | |
| 6,177,024 B1 | 1/2001 | Sandoval | |
| 6,398,976 B1 * | 6/2002 | Sandoval et al. | 252/62 |
| 6,403,180 B1 * | 6/2002 | Barrall | 428/36.5 |
| 6,460,576 B2 * | 10/2002 | Vitoorapakorn | 138/149 |
| 6,634,390 B2 | 10/2003 | Toth | |
| 7,624,762 B2 | 12/2009 | Cohen et al. | |
| 2002/0078856 A1 | 6/2002 | Hahn et al. | |
| 2002/0197935 A1 | 12/2002 | Mueller | |
| 2008/0081138 A1 | 4/2008 | Moore et al. | |

FOREIGN PATENT DOCUMENTS

| | | |
|---|---|---|
| JP | 05017722 A * | 1/1993 |
| JP | 08-028780 | 2/1996 |
| JP | 09-316400 | 12/1997 |
| JP | 09-317985 | 12/1997 |
| JP | 2003-138166 | 5/2003 |
| JP | 2005-281626 | 10/2005 |
| WO | WO 2004101699 | 11/2004 |
| WO | WO 2004101699 A1 * | 11/2004 |

* cited by examiner

PRE-APPLIED PROTECTIVE JACKETING CONSTRUCTION FOR PIPE AND BLOCK INSULATION

RELATED U.S. APPLICATION DATA

This application is a divisional application of U.S. patent application Ser. No. 11/938,675, filed Nov. 12, 2007 which claims priority under 35 U.S.C. §119(e) to U.S. provisional application Ser. No. 60/887,892 filed Feb. 2, 2007.

FIELD OF THE INVENTION

The present invention relates to improvements in jacketed pipe and equipment insulation useful in providing weather protection, securement of the insulation to the pipe or equipment, and resistance to physical abuse and corrosion of the pipe or equipment. The present invention also provides pre-applied jacketed insulation with installation benefits over the existing state of the art.

BACKGROUND OF THE INVENTION

In many industries, it is commonplace to provide thermal insulation for pipe and equipment to prevent heat loss or gain. When insulation on pipe and equipment are exposed to the external environment, the insulation material can become wet leading to its physical deterioration, loss of thermal efficiency, and corrosion of the pipe or piece of equipment being insulated. Therefore, an additional outer layer, commonly called a protective jacketing (sometimes also referred to as a lagging or cladding), is installed over the insulation to provide it with weather protection and protection from physical abuse. Currently, the insulation field is lacking protective jacketing constructions whereby the jacketing can be pre-applied to an insulation, and then transported as pre-jacketed insulation construction to an industrial job site such that the construction can be easily, quickly, and efficiently installed on pipe and/or equipment in the field.

Typically, protective jacketing materials, in the form of materials such as sheet metal, plastic sheet, metal foil/plastic laminates, or metal foil/fiberglass cloth laminates, are not adhered to industrial insulation in a factory, prior to transporting the materials to the industrial site. Rather, the insulation materials are first transported to the industrial site, installed on the pipe and/or equipment, and then the protective jacketing is installed separately over top of the insulation. The two are then simply fastened or banded together. The reason the material transport and material installation is done in this sequence is because most industrial insulation surfaces are dusty and fibrous in nature. These characteristics give an insulation surface that is dusty which contains loose fibers and hence, do not allow for direct bonding of the insulation to a protective jacketing. Therefore, the installation process at the industrial site is inherently slow and labor intensive. The protective jacketing must be installed and sealed in a separate step, after the insulation has been installed and restrained with tape or wires or bands.

The practice of the insulation contracting industry is to transport insulation materials and protective jacketing to the industrial job site, then install the insulation on the pipe or equipment, securing it in place with tape, wire or bands, followed by a separate protective jacketing installation step. A drawback of this process is when the insulation and protective jacketing are fastened together, gaps, however minuscule, remain between the protective jacketing overlaps, from one sheet of jacketing to the next, or on the lap joints where the jacketing circumscribes the circular pipe insulation. The movement of the protective jacketing relative to the insulation and the insulated surface, caused by pipe or equipment movement and/or differential thermal expansion and contraction, prevents a true seal. The lack of a seal allows for the possibility of gaps through which water, or other electrolytes, can enter the insulation itself and be absorbed or condensed onto the insulation, leading to CUI. The present invention addresses these shortcomings by first providing an industrial insulation amenable for direct bonding to a protective jacketing.

It would be desirable to provide insulation amenable for bonding or adhering uniformly to a protective jacketing. Such an insulation substrate would preclude the possibility of movement of a jacketing, once the insulation-jacketing construction is installed on a pipe or piece of equipment. This would allow application of a protective jacketing in a factory setting, which would dramatically decrease installation time and costs in the field (e.g., by reducing tools, labor and materials). Prior to the present inventors' discovery, due to the friable nature of many insulation materials, a protective jacketing had to be manually installed on the thermal insulation at the site of the pipe or equipment that required insulation. A protective jacketing-insulation material composite structure serves to secure the protective jacketing-insulation bond from disturbance under typical industrial conditions. The present invention addresses these and other needs.

Corrosion of metal pipe or piece of equipment under insulation, known as corrosion under insulation (CUI), presents a major problem for most process industries, including, but not limited to, petroleum, chemical, food and paper. In many instances, corrosion of pipe or equipment is not determined until system failure. Pipe or equipment leakage, catastrophic damage caused by such leakage, significant operational downtime and high maintenance costs are all effects CUI.

Although corrosion is easily diagnosed by looking at the exterior surface of a pipe or piece of equipment, insulation and protective jacketing on the outer surface of the pipe or equipment insulation presents an optical, barrier to the pipe or piece of equipment. Because water intrusion to the insulation is unpredictable, CUI is also highly unpredictable, so inspection has to encompass the entire insulated system in order to be effective. Corrosion of a particular segment of a pipe or piece of equipment, therefore, can be both costly and arduous to decipher.

For corrosion to occur on a metal pipe or piece of equipment, there must be (1) an anode, (2) a cathode, (3) an electrical path caused by a potential difference between the anode and cathode, and (4) an electrolyte. Inherent to all metals are an anode, cathode and electrical path (i.e., the metal surface of the pipe or piece of equipment). Speed and frequency of transfer of electrons between the anode and cathode correlates with the tendency of a pipe or piece of equipment to corrode, and will differ based on material of the pipe or piece of equipment, its contents, system operating temperature, etc. Although CUI can be inhibited somewhat at the outset by choosing one substrate over another, the substrate will still be susceptible to CUI if electrolytes are introduced via damp insulation. It is not always cost feasible to replace existing pipe or piece of equipment, so the substrate cannot always be selected. It is of particular concern, therefore, to limit electrolytes (in most cases water), from interaction with insulation surrounding a pipe or piece of equipment, and the pipe or piece of equipment itself, by sealing the insulation from the external environment. The present invention addresses this need.

There are methods to detect CUI before system failure, such as removing insulation, followed by inspection of the pipe or piece of equipment, utilizing moisture density gauges and infrared surveys. These methods are time consuming, costly, and in many cases, require operational downtime. Detection efforts can be limited by implementing systems which employ composite structures comprised of a protective jacketing over insulation. This solution, if provided correctly (i.e., a uniform interface between the protective jacketing and insulation), would limit the CUI inspection costs of an industrial system because no vapor could be trapped between the protective jacketing layer and the insulation layer. Current methods for providing a protective jacketing allow for the protective jacketing to move, and consequently, do not provide a seal from the external environment. For example, metal bands have been used to attach an aluminum jacket to pipe insulation; these restrain the insulation and the metal jacket to the pipe but do not preclude intrusion of water at the joints, where the jacketing material overlaps itself or the adjacent section. This technique leaves at least a gap between the insulation's exterior surface and the jacket, which in turn permits movement of the jacket and intrusion of water.

SUMMARY OF THE INVENTION

The present invention, in one aspect, concerns a method for inhibiting the corrosion of a pipeline, and can include the steps of forming a porous insulation into an elongated-arcuate-shape, applying a copolymer-sodium silicate solution layer to the outer surface of the insulation and at least partially within the pores, permitting the copolymer-sodium silicate solution layer to set to a threshold amount, adhering an outer protective jacketing to the copolymer-sodium silicate solution layer after the permitting step is accomplished, installing the protective-jacketing-insulation composite structure to the outer surface of a pipe or piece of equipment, and sealing any exposed edges or seams that may exist between multiple installed products.

In another aspect, the sodium in the copolymer-sodium silicate solution layer is substituted with a different metal, having similar properties to that of sodium, such as potassium.

In another aspect, the porous insulation can be comprised of calcium silicate, mineral fiber, rock mineral wool, slag mineral wool, perlite, fiberglass, or a combination of these materials.

In a further aspect, the insulation and protective jacketing can be joined together by pressure sensitive or contact adhesive.

In still another aspect, the invention concerns a coated insulation amenable for protective jacketing adhesion, for an outer surface of a pipeline. The coated insulation includes an elongated-arcuate-shaped porous insulation, having an exterior surface with pores, as well as an interior surface sized to complement the outer surface of the pipeline. A copolymer-sodium silicate layer is disposed upon at least the insulation's exterior surface including within the pores.

In another aspect, the invention concerns a method for inhibiting pipe corrosion, and can include the steps of disposing a porous insulation around the pipe, applying a copolymer-sodium silicate solution to the insulation and at least partially within the pores of the insulation, and adhering an outer protective jacketing to the sodium silicate solution layer.

A further aspect of the invention provides a composite insulation-protective jacketing structure for the outer surface of a pipe or piece of equipment, in which an elongated-arcuate-shaped insulation, being made from a material having pores, having an interior surface sized to complement the outer surface of the pipe, and an exterior surface, a copolymer-sodium silicate layer disposed upon the exterior surface of the insulation and within the pores of the insulation, and an outer protective jacketing joined continuously to the copolymer-sodium silicate layer.

In a further aspect, the invention can have the insulation layer composed of first and second elongated arcuate-shaped insulation members which are combinable so as to define a tube, that form fits to a pipe segment.

In a further aspect, the protective jacketing comprises a release layer of pressure sensitive adhesive, intended to join the two insulation members.

Still, yet another aspect of the invention provides a kit which can comprise protective jacketing comprising a release layer of pressure sensitive adhesive that operates to join two arcuate-shaped insulation members, which are combinable so as to define a tube, that form-fit to a pipeline segment. The insulation members include a copolymer-sodium silicate layer disposed on an exterior surface thereof and at least partially within the pores of the exterior surface. The kit includes contact adhesive to seal any cracks or edges between adjacent jacketings.

DETAILED DESCRIPTION OF THE INVENTION

Petroleum, chemical, food processing applications and the like require systems that operate at a wide range of temperatures. When implementing these processes, it is desirable to keep energy consumption to a minimum and efficiency to a maximum by surrounding pipe and equipment with thermal insulation. The insulation should also protect operators accessing the pipe and equipment from burn and skin damage. For an insulation to be amenable to an array of applications, it should be able to withstand high temperatures and must be structurally strong.

The properties that allow insulations to be mechanically robust and to withstand high temperatures (fibrous, porous structures) are the same properties which cause the materials to have friable (i.e., having dust and loose fibers) surfaces with high surface areas, precluding an adhesive bond between the protective jacketing and insulation, on their own, to provide an optimal jacketing-insulation construction.

An insulation bond to a protective jacketing, in accordance with the present invention, can provide a weather and physical abuse barrier that is structurally strong and can prevent corrosion of a pipe or piece of equipment, occurring between a pipe's or equipment's outer surface and its insulation. The protective jacketing-insulation composite structure serves to increase installation efficiency on the pipe and equipment, thereby decreasing installation time and costs.

Figure 1A:
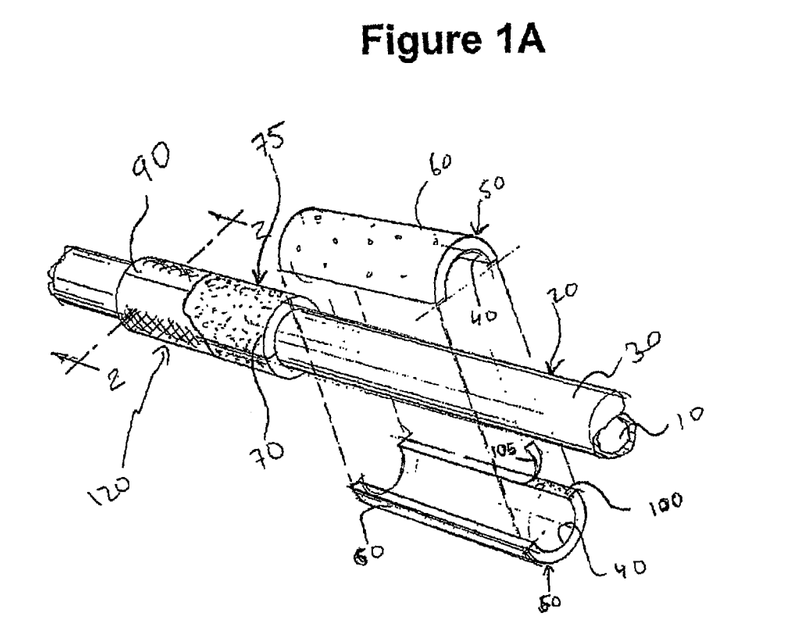
FIG. 1A is a diagram of a protective jacketing-insulation composite structure, in accordance with one embodiment of the invention, installed around a pipe.

By way of overview and introduction, a jacketed pipe insulation (also referred to herein as a "composite structure") according to one embodiment of the invention is shown in FIG. 1A. The embodiment of the jacketed-pipe insulation 120, wherein the jacket is pre-applied, is shown in FIG. 1A, in position around a conventional pipe 20. The insulation 120 has an interior surface 10 and an exterior surface 30. The composite structure 120 includes two arcuate-shaped porous insulation members 50, each having an interior surface 40 and an exterior surface 60. The exterior surface of the insulation 60 has a copolymer-sodium silicate solution 70 disposed on it and within the pores of the insulation, in accordance with one embodiment of the invention. Adhered directly to the coated insulation 75, after the coating has set, is a protective jacketing 90, which bonds the coating by an adhesive contact 80 (see FIG. 2). The adhesive contact can be pressure or contact sensitive. The two arcuate-shaped insulation members 50 are joined together by a pressure sensitive adhesive 100, protected by a release layer 105. These components are discussed in turn.

Preferably, the insulation 50 comprises a substrate having a copolymer-sodium silicate coating, that sets to have a smooth surface that is free of dust and loose fibers. In some embodiments, the substrate is calcium silicate insulation comprised of the following materials: $\geq 93\%$ calcium silicate (CAS#1344-95-2), 0%-2% synthetic vitreous fiber (CAS#65997-17-3), 0%-6% sodium silicate (CAS#1344-09-8), 0%-2% cellulose fiber (CAS#9004-34-6), and $\leq 1\%$ iron based color (CAS#51274-00-1).

In another embodiment, the insulation is comprised of either expanded perlite insulation material, in a rigid form, mineral fiber insulation, or a combination. The mineral fiber can be comprised of rock mineral wool, slag mineral wool, or fiber glass based products, or a combination of these mineral fibers.

Figure 6:
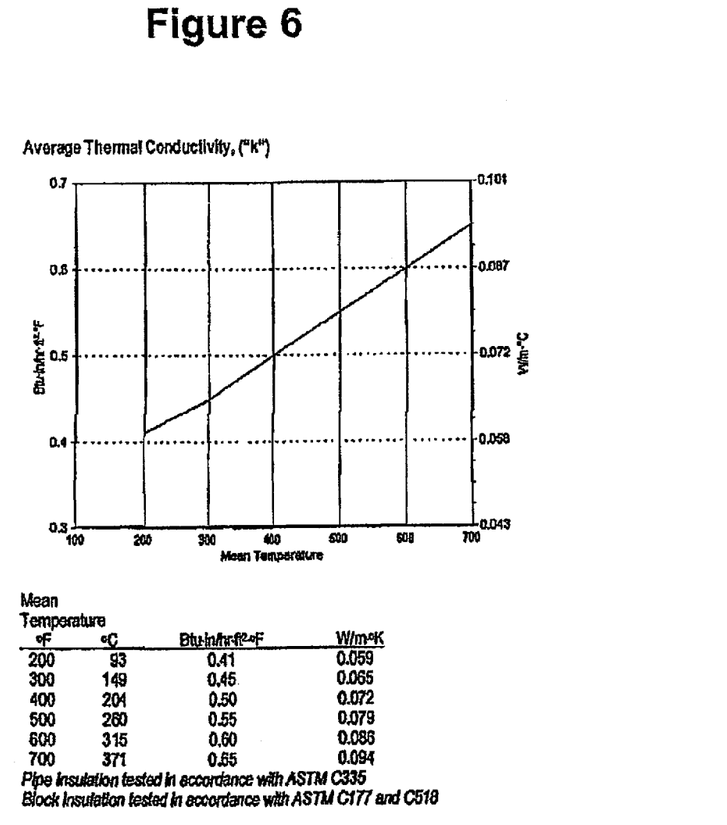
FIG. 6 is a graph of the thermal conductivity of a calcium silicate thermal insulation.

The properties (e.g., physical properties, dimensional tolerances, qualification requirements such as compression strength and thermal conductivity) of the block and arcuate insulations provided here match or exceed the requirements of the American Society for Testing and Materials (ASTM, Specification C533: "Standard Specification for Calcium Silicate Block and Pipe Thermal Insulation", Specification C610: "Standard Specification for Molded Expanded Perlite Block and Pipe Thermal Insulation," Specification C547: "Standard Specification for Mineral Fiber Pipe Insulation," and Specification C612: "Standard Specification for Mineral Fiber Block and Board Insulation"). The thermal conductivity of the insulations were determined with ASTM test methods C335, C177 and C518. The thermal conductivity ("k") of a preferred arcuate insulation composition (i.e., calcium silicate insulation with a sodium silicate solution layer disposed on the surface) as a function of mean temperature, is provided in FIG. 6.

Figure 1B:
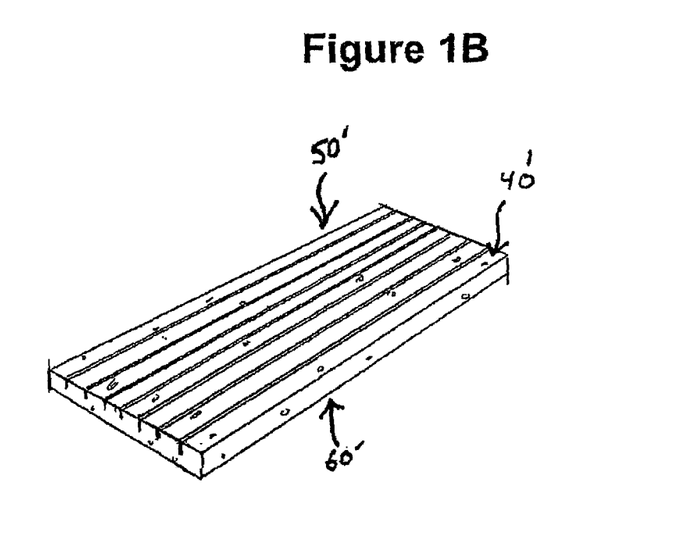
FIG. 1B is a diagram of one embodiment of the invention, showing rectangular block insulation coated with a copolymer-sodium silicate composition.
Figure 5:
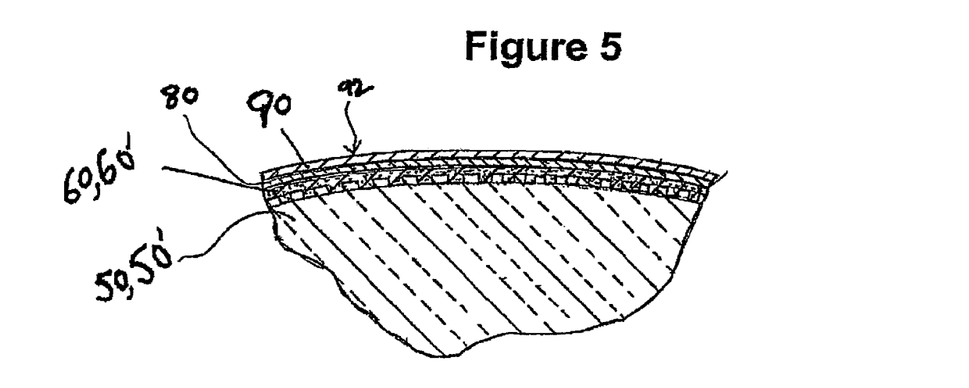
FIG. 5 is a detailed view of a portion of the cross section of FIG. 4.

In one embodiment, shown in FIG. 1B, an insulation 56 can be provided in block (e.g., parallelogram) form with thicknesses, for example, from about 25 mm to about 114 mm. The block insulation can be rectangular in shape with a slotted interior surface 40'. It can then be formed to a desired shape, to form fit around the desired structure. For example, if the block 50' is to surround a tubular structure, the slots on the interior surface 40' can be oriented to face toward the pipe and will pinch closed as the block is curved around the pipe. The exterior surface 60' of the insulation 50' can be provided with a copolymer-sodium silicate solution layer 70 so that it is included when the insulation is formed into its desired shape. In this way, the exterior surface is coated in a continuous manner (not shown in FIG. 1B), thereby providing an even, uniform, and flat surface for the protective jacketing to be applied (see FIG. 5). The resulting flat outer surface takes the form of a polygon. Block insulation is employed, in certain embodiments, to surround a cylindrical surface with a large diameter.

In some embodiments, the exterior surface 66 of the insulation 56, is provided with a pre-applied copolymer-sodium silicate solution layer 70 so that it is included when the insulation is formed into its desired shape. In other embodiments, the copolymer-sodium silicate solution is applied to the insulation's outer surface after the block insulation is formed into its desired shape. In some embodiments, every surface of the block insulation is coated with a copolymer-sodium silicate solution layer (e.g., by submerging insulation into the solution).

Figures 3, 4:
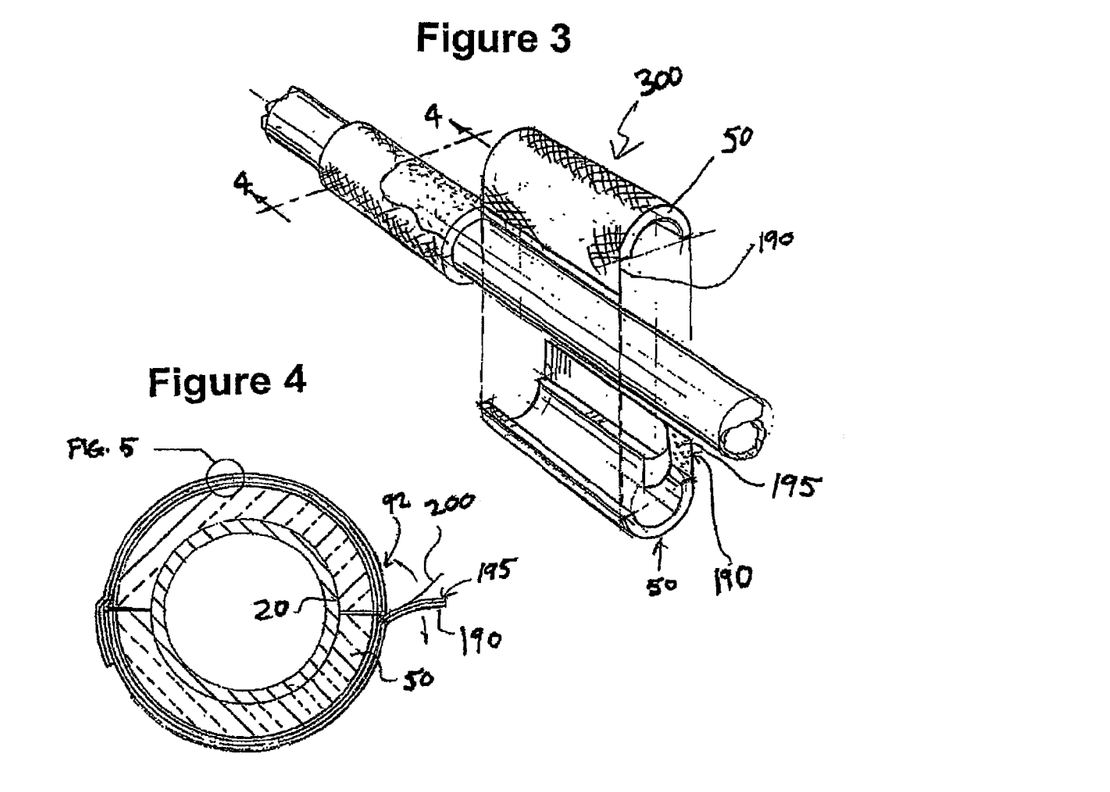
FIG. 3 is a diagram of one embodiment of the invention, showing elongated-arcuate-shaped insulation coated with a copolymer-sodium silicate composition.
FIG. 4 is a cross section of a jacketed insulation, in accordance with one embodiment of the present invention.

The insulation can also be provided as elongated-arcuate-shaped members 50, as shown in FIG. 1A and FIG. 3, having interior surfaces 40 shaped so as to fit snugly around the external surface 30 of a pipe or piece of equipment. For example, two elongated-arcuate-shaped insulation members can be provided to fully surround the exterior 30 of a pipe 20 (FIG. 1A). The dimensions of the pipe insulation can be specified by the end user. In some embodiments, the pipe insulation is about 914 mm in length (about 3 feet) and can range in thicknesses, for example, from about 25 mm to about 152 mm. Other insulation thicknesses, however, can be used as may be appropriate for a given insulation project.

To provide a protective jacketing for a pipe or piece of equipment, a jacketing comprising a laminate of metal foil, plastic film, and/or fiberglass cloth, or another protective jacketing material such as a sheet metal is applied to the insulation members 50, 50'. The porous-insulation 50, 50' on its own, however, is not amenable for a protective jacketing 90 to be adhered due to the insulation's friable and dusty nature. Rather, were a protective jacketing to be applied directly to the insulation, the protective jacketing 90 can still allow electrolytes, namely water, to penetrate the insulation. Because of the insulation's porous and/or fibrous nature, contact cement or a pressure sensitive adhesive used to bond protective jacketing to an insulation will not allow for the formation of a uniform interface between the protective jacketing 90 and insulation's exterior surface 60, 60.

Referring again to FIG. 1A, a copolymer-sodium silicate solution, having a suitable viscosity, is applied on the exterior surface 60 of the insulation 50. Although a copolymer-sodium silicate solution is used here, in some embodiments, sodium can be replaced with another metal, having similar properties to that of sodium, e.g., another group I metal. The particular coating prepares the outer surface of the insulation to bond in a continuous, uniform manner to the jacketing. In this regard, the coating can at least partially enter the pores of the insulation. The solution selected for use, once disposed upon the insulation, and at least partially within the pores, should not have a materially (e.g., significant) impact on the insulating properties of the unmodified insulation. For insulation members 50, 50', the coating can be a copolymer-sodium silicate based liquid composition. In some embodiments, the copolymer-sodium silicate based liquid composition comprises 7.5% to about 15% sodium silicate (CAS#1344-09-08). Other ingredients can be present in any embodiment of a copolymer-sodium silicate based liquid composition useful in the present invention include any of the following: potassium hydroxide, sodium hydroxide, sodium nitrite, methylcellulose calcium carbonate, glycerol, elastomeric copolymer, acrylate ester, sodium polyacrylate, sodium polystyrene sulfonate, ethylene-vinyl acetate, ethylene-methyl acrylate, titanium dioxide, and cupric sulfate. In one embodiment, the sodium silicate composition is RainKote™, diluted 50% in water, available from the Industrial Insulation Group ("IIG") of Brunswick, Ga. (IIG website—intelligentinsulation.com).

The solution's viscosity can differ when applying to one substrate vs. another, depending on the composition and porosity of the insulation to which it is applied. In addition, each substrate, depending on its properties, is amenable to a range of solution viscosities. The solution, if too viscous, will not penetrate into the pores of an insulation member, and consequently, could provide a flat, even surface for cladding application, but at risk of delaminating. At the other extreme, if the solution is not sufficiently viscous, it will penetrate the insulation, deep into the pores, impacting the insulation properties and not providing a uniform interface (i.e., the surface area of the coated insulation will be comparable to the surface are of an uncoated insulation). A solution with intermediate viscosity will sink at least partially within the pores yet provides a substantially flat surface which is substantially chemically homogeneous.

When the solution has an appropriate viscosity, once applied, it will absorb at least partially into the top surface (including the pores), and form a substantially chemically homogeneous (uniform) layer, to prevent the occurrence of gaps between the coated insulation and jacketing layer.

One of ordinary skill in the art will recognize how to optimize the viscosity of the solution for application to a particular substrate. The solution's viscosity will vary depending on the specific properties of the insulation, e.g., the pore size and space between pores. Empirical testing provides one way to obtain an optimal viscosity of a sodium silicate solution. First, a substrate is chosen for solution application. Next, a copolymer-sodium silicate solution (optionally, the sodium silicate can be replaced with a metal silicate having similar chemical and functional properties to that of sodium silicate) should be diluted serially (or diluted in another manner), and the resulting solutions applied to insulation sections or portions thereof. Based on the ease of application, nature of coating (e.g., thickness, uniformity, evenness, etc.), and whether a protective jacketing can adhere, it will become evident to one of skill in the art which solution viscosity to employ, to provide an optimal substrate for jacket application.

Table 1 provides examples of how to prepare solutions of various viscosities, for application onto calcium silicate insulation. RainKote™ solution was diluted serially (Table 1, column 1), and applied to calcium silicate substrates. In each case tested, the solution was sprayable, using a Wagner Paint Sprayer Pro spray gun. The resulting substrate after solution application, was amenable for cladding application. As can be seen in Table 1, ascertainable viscosities ranging from 80,000 cP to 323 cP are sufficiently sprayable and applicable, when using a copolymer-sodium silicate solution applied to a calcium silicate insulation.

TABLE 1

Viscosities of Calstik glue amenable for application to calcium silicate substrate

| Ratio (sodium silicate solution: water) | Viscosity (cP) | Sprayable | Substrate |
|---|---|---|---|
| 1:0 | 80,000 | yes | calcium silicate |
| 3:1 | 2870 | yes | calcium silicate |
| 2:1 | 1050 | yes | calcium silicate |
| 3:2 | 323 | yes | calcium silicate |
| 1:1 | 57.0 | yes | calcium silicate |

Generally, the copolymer-sodium silicate liquid composition, once disposed on a substrate, is referred to as a "copolymer-sodium silicate solution layer" or a "elastomeric copolymer-sodium silicate layer."

The elastomeric copolymer-sodium silicate layer 70 operates in the jacketing-insulation construction 120 to fill voids in the porous-insulation 50, 50' thereby creating a uniform surface on the insulation for the protective jacketing 90 to be applied using a pressure sensitive or contact adhesive between the insulation and the protective jacketing.

The copolymer-sodium silicate solution 70, once applied to at least the exterior surface 60 of the insulation 50, is permitted to set to a threshold amount, optionally, under controlled conditions of temperature, pressure and humidity. Thereafter, the protective jacketing 90 is applied to the copolymer-sodium silicate layer 70, using a pressure sensitive acrylic adhesive 80 (described below) to circumferentially surround the pipe 20, as can be seen in the cross section of FIG. 2.

However, the protective jacketing 90 can be preadhered to the insulation 50, before transport to the industrial site, to allow for a one step direct installation on a pipe or piece of equipment (see FIGS. 3 and 4). Thus, an end user can adhere the protective jacketing 90 directly to the coated insulation 75 via an adhesive contact such as an acrylic or contact adhesive 80, or the protective jacketing 90 can be preapplied to the coated insulation 75 in a factory setting and provided to an end user. Optionally, a pressure sensitive adhesive can be used in combination with another bonding agent used to bond the protective jacketing to the coated surface. For example, a pressure sensitive adhesive can be used to seal any seams or exposed edges (see FIGS. 3 and 4).

A consequence of applying the protective jacketing in the factory is the decreased cost associated with one on-site installation step. Materials, tools and labor are all reduced when installing an insulation-jacketing system in one step at the job site. Reusability after maintenance is also an option with the present invention. The composite structure of the present invention can be held in half shells upon removal from a pipe section, thereby allowing reinstallation after maintenance. Insulation without a preapplied protective jacketing will typically not be reused because of the excessive damage incurred when removing the materials.

The present invention also can be constructed so as to notify a user when the composite is being employed. The copolymer-sodium silicate solution can be tinted (e.g., to be blue) or tagged (e.g., using nanostructures in the sodium silicate solution or other markers), thereby distinguishing the insulations having the coating from other insulations. As a result, visual or measured inspection of the protective jacketing-insulation structure can identify whether the structure is a genuine product or counterfeit.

In an exemplary embodiment, shown in FIG. 3, the protective jacketing 90 is supplied to the job site already bonded to the coated insulation member 75 and is comprised of a laminate 190 of aluminum foil, polyester, optionally fiberglass cloth, and adhesive 195 and a release lining 200 below the adhesive. The release lining 200 protects the adhesive 195 and is released upon installation of the protective jacketing-insulation around a pipe. Typically, the protective jacketing is a multi-layer metal foil/plastic film laminate such as from the VENTURECLAD™ 1577 (five-ply) or 1579 (thirteen-ply) series of, laminated aluminum foil/polyester film protective jacketings, available from Venture Tape Corporation of Rockland, Mass. However, any protective jacketing that can be bonded to an insulation can be used with the present invention, provided that the insulation layer includes a coating as described herein. Each VENTURECLAD™ protective jacketing includes a pressure sensitive adhesive layer, and can be applied directly to the coated insulation member 75 without any intervening layer. If necessary, a roller, such as a paint roller, can be used to flatten the applied protective jacketing to assure a strong, uniform bond between the coated insulation material and the protective jacketing.

Figure 2:
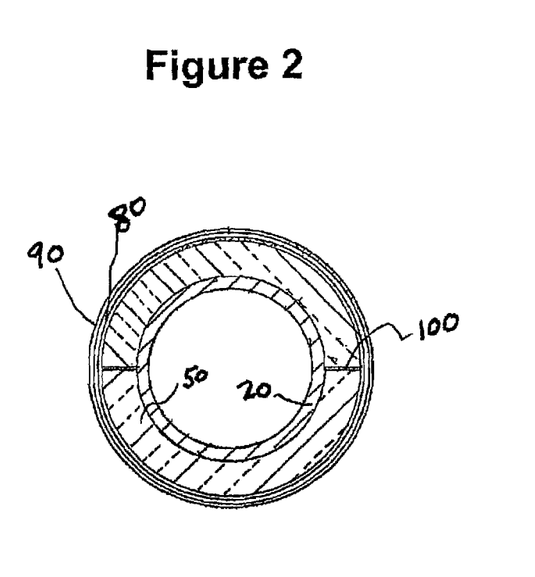
FIG. 2 is a cross section of one embodiment of the invention, installed around a pipe.

When the jacketed-pipe insulation members 300 are supplied in an elongated-arcuate-shape; they are connectable using a flap protective jacketing 190 having a release layer 200 of pressure sensitive adhesive (FIGS. 3 and 4). Two or more jacketed-insulation members 300 are attachable by surrounding a pipe or piece of equipment with the members 300, removing the release layer 200, thereby exposing the pressure sensitive adhesive flap 190, followed by bonding the pressure sensitive adhesive flap of one member to the other member as shown in FIG. 3. Optionally, pressure sensitive adhesive 100, protected by release layer 105 can also be provided to adhere the porous-insulation portions 50 to one another as shown in FIGS. 1A and 2.

FIG. 4 shows in cross section two members 300 having their flaps 190 joined to each other. The members are arranged around a pipe 20, and comprise an insulation member 50, 50', a copolymer-sodium silicate layer 70, 70', adhesive 80, and the protective jacketing 90, as previously described (see FIG. 5). Preferably, the members 300 are further arranged around the pipe 20 so that the flaps 190 are oriented on opposing sides of the pipe. The release layer 200, once removed, exposes an adhesive 195 that can contact or be pressed into engagement with an exterior surface 92 of the protective jacketing 90.

Figure 7:
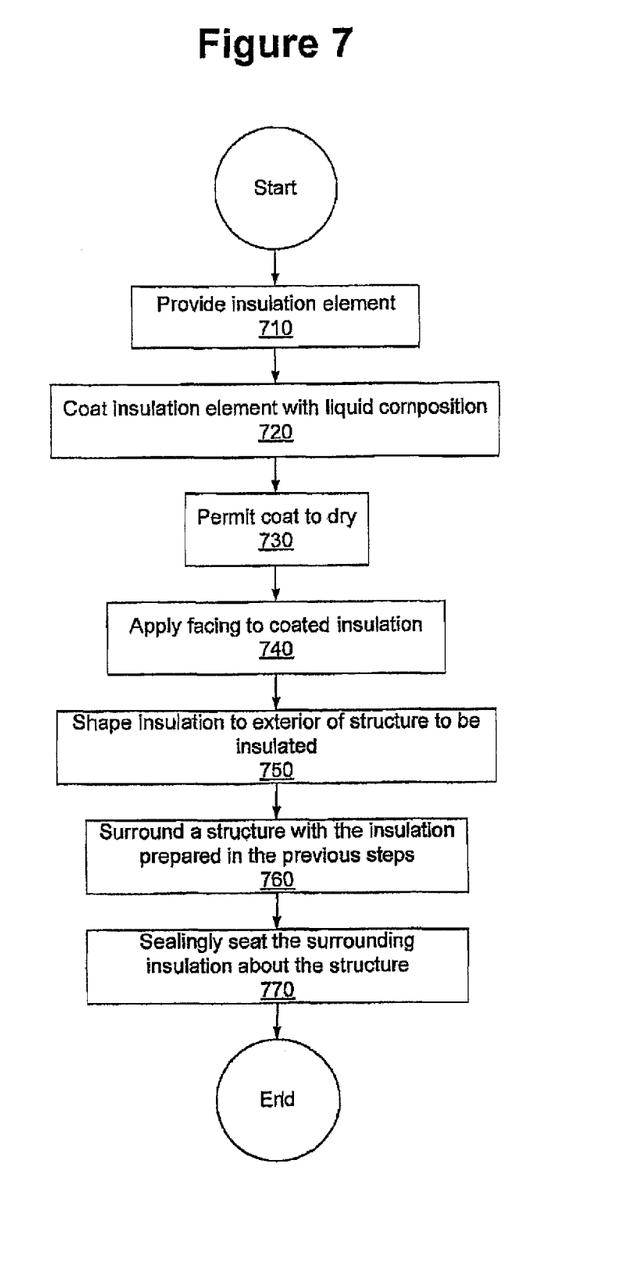
FIG. 7 is a process flow chart showing steps that can be taken to form a jacketed insulation in accordance with one method of the present invention.

FIG. 7 shows steps that can be taken in a method for constructing a composite insulation-protective jacketing structure in accordance with certain aspects of the present invention. Insulation 50 is provided at step 710. Prior to further processing, it can be shaped or formed into elongated-arcuate-shaped members or into another shape appropriate for seating on the exterior of a structure, as indicated at block 750. The insulation 50 can also be preformed in the desired shape. The exact shape of the insulation is dependent on the diameter of the pipe 20 or the shape of the structure to be covered. The insulation member 50 is coated with a copolymer-sodium silicate based composition at step 720, before or after formation into the desired shape.

In one preparation method, the copolymer-sodium silicate composition can be applied to the exterior surface 60 of the insulation 50 by brush. Alternatively, the copolymer-sodium silicate composition is applied to the exterior surface of the insulation by low pressure spray. In yet another embodiment, the insulation 50 can be submerged into the copolymer-sodium silicate composition, thereby coating the entire piece of insulation 50 with a copolymer-sodium silicate coating 70. In various embodiments, sodium is substituted by another group I metal, or a metal which exhibits similar chemical and functional properties to that of sodium. In some embodiments, the metal is selected from the alkali metals, and can be, for example, sodium, potassium, lithium, rubidium, cesium or francium. In other embodiments, the metal is an alkaline earth metal, similar to alkali metals in terms of their basic (as opposed to acidic) properties, and high reactivity.

The coating 70, once applied to at least the exterior surface 60 of the insulation 50, is permitted to set to a threshold amount, by drying under ambient conditions (passive drying), or in a 150° C.-175° C. oven (active drying), for a defined period of time, depending on the thickness of the coating 70, as indicated at step 730. Alternatively, the coating can be dried by other methods known in the art, such as vacuum. The coated insulation 75 can then have a protective jacketing applied and adhered using a pressure sensitive adhesive. The insulation with the pre-applied protective jacketing can then be provided to an end user for installation on a pipe or piece of equipment (FIGS. 3 and 4).

Depending on the desired thickness of the sodium silicate layer 70, the shape of the insulation 50, and uniformity requirements for the elastomeric copolymer-sodium silicate layer 70, one of these coating methods, or a combination of the methods, may be preferred over the others. For example, edges of the insulation may be unable to be coated by spraying the composition and a brush step can be employed to contact areas of the exterior insulation surface 60 the spray is not able to reach.

A protective jacketing 90 is applied to the coated insulation members 75 at step 740. This can be by a pressure or contact adhesive. In the embodiment shown in FIG. 3, the protective jacketing contains an adhesive contact layer 80 and is applied to the coated insulation 75 by pealing off the protective release layer 200. Any air bubbles between the adhesive contact layer 80 and the coated insulation 75 can be eliminated by pressing the air bubbles out, e.g. by using a paint roller or the like. The insulation can be shaped to complement the structure to be surrounded, at step 750, if not done already. In the field, the insulation members can surround a structure as previously described, and as indicated at step 760. Depending on the embodiment, the members could comprise coated insulation members 75 or members 300.

Transverse connections between members (that is, in the radial direction) can be completed using protective jacketing 90, adhesive 80 and a release liner 206, made from the materials discussed above, as indicated at step 770.

As can be understood from the cross section views, the elastomeric copolymer-sodium silicate layer, allowed to fully set, 70 provides a uniform surface for the protective jacketing 90 to bond the exterior surface 60 of the insulation 50. The uniform interface allows for the protective jacketing 90 to stay in place, thus not permitting any gaps to form between the protective jacketing 90 and insulation 50 or between the protective jacketing overlaps on either itself or adjacent pieces of jacketing. Any gaps that form, either between (1) the pipe's exterior surface 30 and the insulation's interior surface 40, or (2) the insulation's exterior surface 60 and the protective jacketing 90 can allow moist air to enter the structure which can cause condensation, leading to CUI.

The invention presented can augment any preexisting coating on a pipe's exterior surface. A preliminary coating can help to seal the surface of a pipe, but is easily damaged by handling and does not always adhere completely to a pipe's exterior surface. The present invention provides additional corrosion inhibiting barriers which can complement an initial coating.

Although the invention has been described in terms of exemplary embodiments, it is not limited thereto. The claims should be construed broadly to include other embodiments of the invention that can be made by ones skilled in the art.

We claim:

1. A method for inhibiting pipe corrosion, the method comprising the steps of:
    (a) forming a porous insulation into first and second arcuate shaped parts that are separate from one another, wherein each of the first and second parts has a first edge that runs a length of the part and a second edge that runs a length of the part,
    (b) applying a copolymer-sodium silicate solution layer to at least the exterior surface of the insulation of each of the first and second arcuate shaped parts and at least partially within the pores of the insulation, wherein the copolymer-sodium silicate solution layer includes sodium polyacrylate,
    (c) permitting the copolymer-sodium silicate solution layer to set to a threshold amount,
    (d) adhering an outer protective jacketing directly to the copolymer-sodium silicate solution layer of each of the first and second arcuate shaped parts, after the permitting step is accomplished, wherein the outer protective jacketing includes a pre-applied adhesive layer disposed along a surface thereof and a protective release layer that covers the adhesive to form the outer protective jacketing which is a pre-formed layered component that is separate from the insulation coated with the copolymer-sodium silicate solution layer, the outer protective jacketing of the first part having a first flap portion that extends beyond the first edge of the first part, the outer protective jacketing of the second part having a second flap portion that extends beyond the second edge of the second part, each of the first and second flap portions having a pressure sensitive adhesive formed along an inner surface thereof, wherein the outer protective jacketing comprises a laminate structure including at least a foil material and is flexible so as to allow the first and second flap portions to bend and conform to the arcuate shape of the underlying first and second parts, wherein the step of adhering the outer protective jacketing directly to the copolymer-sodium silicate solution layer comprises removing the protective release layer and placing the adhesive layer of the protective jacketing into contact with the copolymer-sodium silicate solution layer,
    (e) installing the product made in steps (a)-(d) onto the exterior surface of a pipe or piece of equipment by placing the first and second arcuate shaped parts about the pipe or piece of equipment such that the two first edges mate together and the two second edges mate together, and
    (f) adhering the first flap portion to the second arcuate shaped part about the first edge such that the first flap portion extends circumferentially along an exterior surface of the second arcuate shaped part, and adhering the second flap portion to the first arcuate shaped part about the second edge such that the second flap portion extends circumferentially along an exterior surface of the first arcuate shaped part resulting in the product made in steps (a)-(d) being circumferentially disposed about the pipe or piece of equipment.

2. The method of claim 1, wherein the insulation is comprised of calcium silicate, mineral fiber, rock mineral wool, slag mineral wool, perlite, fiber glass, or a combination thereof.

3. The method of claim 1, wherein the adhering step comprises adhering a continuous outer protective jacketing to the copolymer-sodium silicate solution layer without any intervening layer.

4. The method of claim 1, wherein the applying step comprises brushing the copolymer-sodium silicate solution onto the insulation.

5. The method of claim 1, wherein the applying step comprises spraying the copolymer-sodium silicate solution onto the insulation at a low pressure.

6. The method of claim 1, wherein the laminate comprises a multilayer laminate of foils, plastic film, and optionally fiberglass cloth.

7. A method for inhibiting pipe corrosion, the method comprising the steps of:
    (a) forming a porous insulation into first and second arcuate shaped parts that are separate from one another, wherein each of the first and second parts has a first edge that runs a length of the part and a second edge that runs a length of the part;
    (b) applying a copolymer-sodium silicate solution layer to at least the exterior surface of the insulation of each of the first and second arcuate shaped parts and at least partially within the pores of the insulation, wherein the copolymer-sodium silicate solution layer includes sodium polyacrylate;
    (c) permitting the copolymer-sodium silicate solution layer to set to form a dry layer;
    (d) adhering an outer protective jacketing directly to the copolymer-sodium silicate solution layer of each of the first and second arcuate shaped parts, after the copolymer-sodium silicate solution layer has set and formed the dry layer, wherein the outer protective jacketing includes a pre-applied adhesive layer disposed along a surface thereof and a protective release layer that covers the adhesive to form the outer protective jacketing which is a pre-formed layered component that is separate from the insulation coated with the copolymer-sodium silicate solution layer, wherein the step of adhering the outer protective jacketing directly to the copolymer-sodium silicate solution layer comprises removing the protective release layer and placing the adhesive layer of the protective jacketing into contact with the copolymer-sodium silicate solution layer; and
    (e) installing the product made in steps (a)-(d) onto the exterior surface of a pipe or piece of equipment.

* * * * *